(12) United States Patent
Klein et al.

(10) Patent No.: US 11,373,120 B2
(45) Date of Patent: Jun. 28, 2022

(54) ATTENTION MECHANISM FOR NATURAL LANGUAGE PROCESSING

(71) Applicant: SAP SE, Walldorf (DE)

(72) Inventors: Tassilo Klein, Berlin (DE); Moin Nabi, Berlin (DE)

(73) Assignee: SAP SE, Walldorf (DE)

( * ) Notice: Subject to any disclaimer, the term of this patent is extended or adjusted under 35 U.S.C. 154(b) by 480 days.

(21) Appl. No.: 16/695,037

(22) Filed: Nov. 25, 2019

(65) Prior Publication Data

US 2021/0158206 A1 May 27, 2021

(51) Int. Cl.
| | |
|---|---|
| G06K 9/62 | (2022.01) |
| G06F 17/16 | (2006.01) |
| G06F 40/205 | (2020.01) |
| G06F 40/284 | (2020.01) |
| G06N 20/00 | (2019.01) |

(52) U.S. Cl.
CPC ............. *G06N 20/00* (2019.01); *G06F 17/16* (2013.01); *G06F 40/205* (2020.01); *G06F 40/284* (2020.01); *G06K 9/6259* (2013.01)

(58) Field of Classification Search
USPC .................................................... 704/1–504
See application file for complete search history.

(56) References Cited

U.S. PATENT DOCUMENTS

| | | | | |
|---|---|---|---|---|
| 7,249,012 | B2* | 7/2007 | Moore | ................... G06F 40/44 704/4 |
| 8,571,851 | B1* | 10/2013 | Tickner | ............... G10L 15/1815 704/235 |
| 2005/0108001 | A1* | 5/2005 | Aarskog | ............... G06F 40/253 704/10 |
| 2014/0369596 | A1* | 12/2014 | Siskind | .................. G06V 20/47 382/158 |
| 2020/0050638 | A1* | 2/2020 | Hancock | ........... G06F 16/90344 |

(Continued)

OTHER PUBLICATIONS

Bailey, D. et al. 2015. "The winograd schema challenge and reasoning about correlation." In 2015 AAAI Spring Symposium Series.

(Continued)

*Primary Examiner* — Marcus T Riley
(74) *Attorney, Agent, or Firm* — Mintz Levin Cohn Ferris Glovsky and Popeo, P.C.

(57) ABSTRACT

A method may include applying a machine learning model, such as a bidirectional encoder representations from transformers model, trained to generate a representation of a word sequence including a reference word, a first candidate noun, and a second candidate noun. The representation may include a first attention map and a second attention map. The first attention map may include attention values indicative of a strength of various linguistic relationships between the reference word and the first candidate noun. The second attention map may include attention values indicative of a strength of various linguistic relationships between the reference word and the second candidate noun. A natural language processing task, such as determining whether the reference word refers to the first candidate noun or the second candidate noun, may be performed based on the first attention map and the second attention map. Related methods and articles of manufacture are also disclosed.

20 Claims, 7 Drawing Sheets

(56) References Cited

U.S. PATENT DOCUMENTS

2021/0117815 A1* 4/2021 Creed .................. G06F 17/16
2021/0158206 A1* 5/2021 Klein .................. G06F 40/205

OTHER PUBLICATIONS

Devlin, J. et al. 2018. "Bert: Pre-training of deep bidirectional transformers for language understanding." arXiv preprint arXiv:1810.04805.

Emami, A. et al. 2018. "A knowledge hunting framework for common sense reasoning." In Proceedings of the 2018 Conference on Empirical Methods in Natural Language Processing, pp. 1949-1958, Brussels, Belgium. Association for Computational Linguistics.

Hochreiter, S. et al. 1997. "Long short-term memory." Neural computation, 9(8):1735-1780.

Kocijan, V. et al. 2019. "A surprisingly robust trick for the winograd schema challenge." In Proceedings of the 57th Annual Meeting of the Association for Computational Linguistics, ACL 2019, Florence, Italy, Jul. 28-Aug. 2, 2019. Association for Computational Linguistics.

Lee, K. et al. 2017. "End-to-end neural coreference resolution." In Proceedings of the 2017 Conference on Empirical Methods in Natural Language Processing, pp. 188-197, Copenhagen, Denmark. Association for Computational Linguistics.

Levesque, H. et al. 2012. "The winograd schema challenge." In Thirteenth International Conference on the Principles of Knowledge Representation and Reasoning.

Liu, H. et al. 2004. "ConceptNet—a practical commonsense reasoning tool-kit." BT technology journal, 22(4):211-226.

Liu, Q. et al. 2017. "Combing context and commonsense knowledge through neural networks for solving winograd schema problems." In 2017 AAAI Spring Symposium Series.

Liu, Q. et al. 2016. "Probabilistic reasoning via deep learning: Neural association models." arXiv preprint arXiv:1603.07704.

Mikolov, T. et al. 2013. "Efficient estimation of word representations in vector space." arXiv preprint arXiv:1301.3781.

Miller, G. A. 1995. "WordNet: a lexical database for English." Communications of the ACM, 38(11):39-41.

Morgenstern, L. et al. 2016. "Planning, executing, and evaluating the winograd schema challenge." AI Magazine, 37(1):50-54.

Peng, H. et al. 2015. "Solving hard coreference problems." In Proceedings of the 2015 Conference of the North American Chapter of the Association for Computational Linguistics: Human Language Technologies, pp. 809-819.

Peters, M. E. et al. 2018. "Deep contextualized word representations." arXiv preprint arXiv:1802.05365.

Peters, M. et al. 2018. "Dissecting contextual word embeddings: Architecture and representation." In Proceedings of the 2018 Conference on Empirical Methods in Natural Language Processing, pp. 1499-1509, Brussels, Belgium. Association for Computational Linguistics.

Radford, A. et al. 2018. "Improving language understanding by generative pre-training." URL https://s3-US-west-2.amazonaws.com/openai-assets/research-covers/languageunsupervised/language under- standing paper. pdf.

Rahman, A. et al. 2012. "Resolving complex cases of definite pronouns: the winograd schema challenge." In Proceedings of the 2012 Joint Conference on Empirical Methods in Natural Language Processing and Computational Natural Language Learning, pp. 777-789. Association for Computational Linguistics.

Roemmele, M. et al. 2011. "Choice of plausible alternatives: An evaluation of commonsense causal reasoning." In 2011 AAAI Spring Symposium Series.

Saba, W.S. 2018. "A simple machine learning method for commonsense reasoning? A short commentary on Trinh & Le" (2018). *CoRR*, abs/1810.00521.

Schulller, P. 2014. "Tackling winograd schemas by formalizing relevance theory in knowledge graphs." In Fourteenth International Conference on the Principles of Knowledge Representation and Reasoning.

Sharma, A. et al. 2015. "Towards addressing the winograd; schema challengebuilding and using a semantic parser and a knowledge hunting module." In Twenty-Fourth International Joint Conference on Artificial Intelligence.

Tang, G. et al. 2018. "Why self-attention? A targeted evaluation of neural machine translation architectures." arXiv preprint arXiv:1808.08946.

Trichelair, P. et al. 2018. "On the evaluation of common-sense reasoning in natural language understanding." arXiv preprint arXiv:1811.01778.

Trinh, T.H. et al. 2018. "A simple method for commonsense reasoning." arXiv preprint arXiv:1806.02847.

Vaswani, A. et al. 2017. "Attention is all you need." In Advances in Neural Information Processing Systems, pp. 5998-6008.

Zellers, R. et al. 2018. "Swag: A large-scale adversarial dataset for grounded commonsense inference." arXiv preprint arXiv:1808.05326.

\* cited by examiner

ATTENTION MECHANISM FOR NATURAL LANGUAGE PROCESSING

FIELD

The present disclosure generally relates to machine learning and more specifically to an attention mechanism for natural language processing.

BACKGROUND

Machine learning models may be trained to perform a variety of cognitive tasks. For example, a machine learning model trained to perform natural language processing may classify text by at least assigning, to the text, one or more labels indicating a sentiment, a topic, and/or an intent associated with the text. Training the machine learning model to perform natural language processing may include adjusting the machine learning model to minimize the errors present in the output of the machine learning model. For instance, training the machine learning model may include adjusting the weights applied by the machine learning model in order to minimize a quantity of incorrect labels assigned by the machine learning model.

SUMMARY

Methods, systems, and articles of manufacture, including computer program products, are provided for attention based natural language processing. In one aspect, there is provided a system. The system may include at least one data processor and at least one memory. The at least one memory may store instructions that result in operations when executed by the at least one data processor. The operations may include: applying a machine learning model trained to generate a representation of a word sequence, the word sequence including a reference word, a first candidate noun, and a second candidate noun, the representation of the word sequence including a first attention map and a second attention map, the first attention map including a first plurality of attention values indicative of a first strength of a plurality of linguistic relationships between the reference word and the first candidate noun, and the second attention map including a second plurality of attention values indicative of a second strength of the plurality of linguistic relationships between the reference word and the second candidate noun; performing, based at least on the first attention map and the second attention map, a natural language processing task, the natural language processing task including determining that the reference word refers to the first candidate noun and not the second reference noun; and generating a user interface displaying a result of the natural language processing task.

In some variations, one or more of the features disclosed herein including the following features can optionally be included in any feasible combination. A first masked matrix may be generated by at least applying, to the first attention map, a first binary mask matrix. The first masked matrix may be generated to include an entry having a first attention value in response to the first attention value occupying the entry in the first attention map being greater than a second attention value occupying a corresponding entry in the second attention map. A second masked matrix may be generated by at least applying, to the second attention map, a second binary mask matrix. The second masked matrix may be generated to include a zero value in the corresponding entry in response to the second attention value occupying the corresponding entry in the second attention map being less than the first attention value occupying the entry in the first attention map. The first maximum attention score may be a ratio of a first Hadamard sum associated with the first candidate noun relative to a sum of the first Hadamard sum and a second Hadamard sum associated with the second candidate noun. The first Hadamard sum may be determined based on the first masked matrix. The second Hadamard sum may be determined based on the second masked matrix.

In some variations, the plurality of linguistic relationships may include direct objects, noun modifiers, possessive pronouns, passive auxiliary verbs, prepositions, and coreferences. The machine learning model may include a plurality of attention heads. Each of the plurality of attention heads may be configured to determine a strength of one of the plurality of linguistic relationships between each pair of words present in the word sequence.

In some variations, the representation of the word sequence may be an attention tensor that includes the first attention map and the second attention map.

In some variations, the machine learning model may be a bidirectional encoder representations from transformers model.

In some variations, the machine learning model may be trained to generate the representation of the word sequence including by training the machine learning model to perform a masked language modeling and/or a next sentence prediction. The machine learning model may be trained, based at least on unlabeled training data, to generate the representation of the word sequence.

In another aspect, there is provided a method for attention based natural language processing. The method may include: applying a machine learning model trained to generate a representation of a word sequence, the word sequence including a reference word, a first candidate noun, and a second candidate noun, the representation of the word sequence including a first attention map and a second attention map, the first attention map including a first plurality of attention values indicative of a first strength of a plurality of linguistic relationships between the reference word and the first candidate noun, and the second attention map including a second plurality of attention values indicative of a second strength of the plurality of linguistic relationships between the reference word and the second candidate noun; performing, based at least on the first attention map and the second attention map, a natural language processing task, the natural language processing task including determining that the reference word refers to the first candidate noun and not the second reference noun; and generating a user interface displaying a result of the natural language processing task.

In some variations, one or more of the features disclosed herein including the following features can optionally be included in any feasible combination. The method may further include: generating a first masked matrix by at least applying, to the first attention map, a first binary mask matrix, the first masked matrix generated to include an entry having a first attention value in response to the first attention value occupying the entry in the first attention map being greater than a second attention value occupying a corresponding entry in the second attention map; and generating a second masked matrix by at least applying, to the second attention map, a second binary mask matrix, the second masked matrix generated to include a zero value in the corresponding entry in response to the second attention value occupying the corresponding entry in the second attention map being less than the first attention value occupying the entry in the first attention map. The first maximum attention score may be a ratio of a first Hadamard sum associated with the first candidate noun relative to a sum of the first Hadamard sum and a second Hadamard sum associated with the second candidate noun. The first Hadamard sum may be determined based on the first masked matrix. The second Hadamard sum may be determined based on the second masked matrix.

In some variations, the plurality of linguistic relationships may include direct objects, noun modifiers, possessive pronouns, passive auxiliary verbs, prepositions, and coreferences. The machine learning model may include a plurality of attention heads. Each of the plurality of attention heads may be configured to determine a strength of one of the plurality of linguistic relationships between each pair of words present in the word sequence.

In some variations, the representation of the word sequence may be an attention tensor that includes the first attention map and the second attention map.

In some variations, the machine learning model may be a bidirectional encoder representations from transformers model.

In some variations, the method may further include training the machine learning model to generate the representation of the word sequence including by training the machine learning model to perform a masked language modeling and/or a next sentence prediction. The machine learning model may be trained, based at least on unlabeled training data, to generate the representation of the word sequence.

In another aspect, there is provided a computer program product that includes a non-transitory computer readable storage medium. The non-transitory computer-readable storage medium may include program code that causes operations when executed by at least one data processor. The operations may include: applying a machine learning model trained to generate a representation of a word sequence, the word sequence including a reference word, a first candidate noun, and a second candidate noun, the representation of the word sequence including a first attention map and a second attention map, the first attention map including a first plurality of attention values indicative of a first strength of a plurality of linguistic relationships between the reference word and the first candidate noun, and the second attention map including a second plurality of attention values indicative of a second strength of the plurality of linguistic relationships between the reference word and the second candidate noun; performing, based at least on the first attention map and the second attention map, a natural language processing task, the natural language processing task including determining that the reference word refers to the first candidate noun and not the second reference noun; and generating a user interface displaying a result of the natural language processing task.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to attention mechanisms for natural language processing, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, like labels are used to refer to same or similar items in the drawings.

DETAILED DESCRIPTION

A machine learning model may be trained to perform a natural language processing task by at least subjecting the machine learning model to supervised learning. For example, the machine learning model may be trained to perform coreference resolution, which may include identifying the antecedent of an ambiguous pronoun in a word sequence. However, training the machine learning model for optimal performance may require a large corpus of labeled training samples, each of which including text and at least one ground-truth label corresponding to a correct label for the text. Because generating a sufficiently large corpus of labeled training samples may require excessive resources, training the machine learning model in a supervised manner may often be impracticable.

As such, in some example embodiments, a machine learning controller may train a machine learning model by at least subjecting the machine learning model to unsupervised training. That is, the machine learning model may be trained based on a corpus of unlabeled training samples, which may include different text without any ground-truth labels. Moreover, the trained machine learning model may generate, for a sequence of words, one or more attention maps indicating a relationship between the words in the sequence of words. For example, each word in the word sequence may be associated with an attention map that includes a plurality of attention values, each of which indicating a strength of a connection to another words in the word sequence. A natural language processing task, such as coreference resolution, may be performed based on the one or more attention maps. For example, the antecedent of an ambiguous pronoun in the word sequence may be identified based at least on the one or more attention maps.

In some example embodiments, the machine learning model may be trained to perform a language modeling task. As such, the machine learning model performing the language modeling task may generate the one or more attention maps as a representation of the word sequence. The machine learning model may be a machine learning model that incorporates an attention mechanism such as, for example, a bidirectional encoder representations from transformers (BERT) model. Unlike a recurrent neural network that processes each word in the word sequence sequentially, the bidirectional encoder representations from transformers model may include a transformer configured to process all of the words in the word sequence simultaneously. Training the machine learning model may include training the machine learning model to perform masked language modeling in which the machine learning model identifies words in a sequence of words that have been masked out. Furthermore, the machine learning model may be trained to perform next sentence prediction and determine whether a first sentence follows a second sentence. As noted, the machine learning model may be trained in an unsupervised manner using a corpus of unlabeled training samples.

Figure 1A:
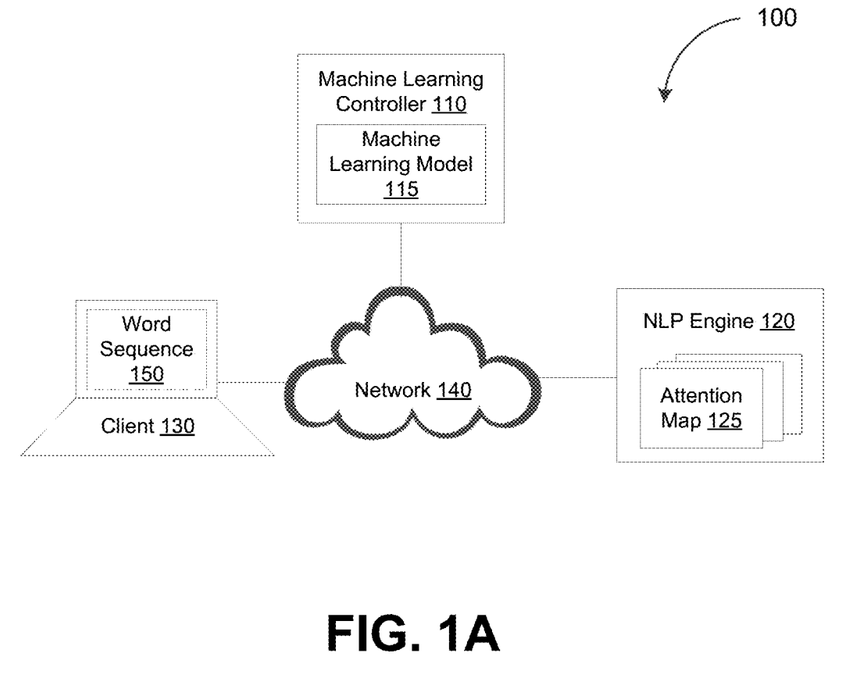
FIG. 1A depicts a network diagram illustrating a machine learning enabled natural language process system, in accordance with some example embodiments.

FIG. 1A depicts a system diagram illustrating an example of a machine learning enabled natural language processing system 100, in accordance with some example embodiments. Referring to FIG. 1A, the machine learning enabled natural language processing system 100 may include a machine learning controller 110, a natural language processing engine 120, and a client 130. The machine learning controller 110, the natural language processing engine 120, and the client 103 may be communicatively coupled via a network 140. It should be appreciated that the client 130 may be a processor-based device including, for example, a smartphone, a tablet computer, a wearable apparatus, a virtual assistant, an Internet-of-Things (IoT) appliance, and/or the like. The network 140 may be any wired network and/or a wireless network including, for example, a wide area network (WAN), a local area network (LAN), a virtual local area network (VLAN), a public land mobile network (PLMN), the Internet, and/or the like.

Figure 1B:
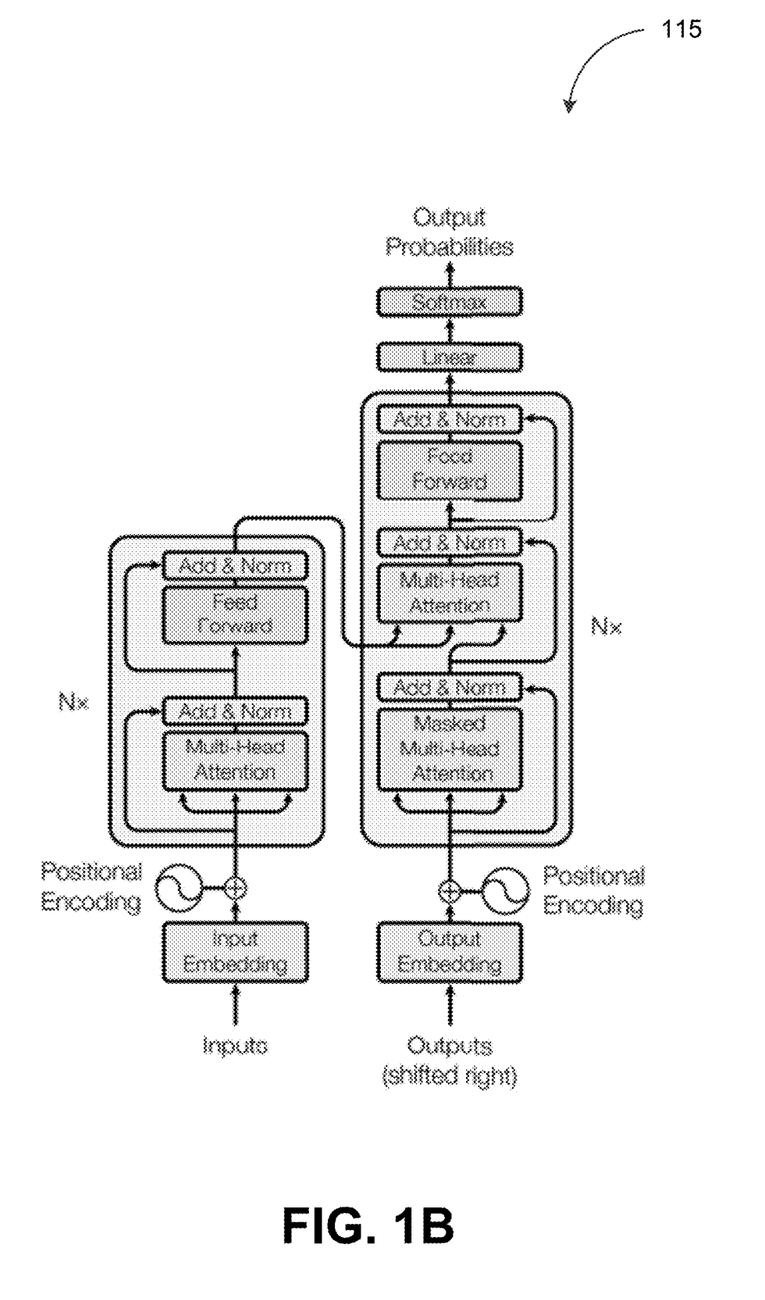
FIG. 1B depicts an example of a bidirectional encoder representations from transformers (BERT) model, in accordance with some example embodiments.

In some example embodiments, the machine learning controller 110 may train a machine learning model 115 to perform a language modeling task. The machine learning model 115 performing the language modeling task may generate one or more attention maps to represent a word sequence 150 including, for example, an attention map 125. The machine learning model 115 may be a machine learning model that incorporates an attention mechanism. For example, the machine learning model 115 may be a bidirectional encoder representations from transformers (BERT) model which, as shown in FIG. 1B, includes a transformer configured to process all of the words in the word sequence 150 simultaneously. Moreover, the word sequence 150 may be received from the client 130. For instance, the natural language processing engine 120 may receive, from the client 130, a request to perform a natural language processing task (e.g., coreference resolution) on the word sequence 150.

Training the machine learning model 115 may include training the machine learning model 115 to perform masked language modeling in which the machine learning model 115 identifies masked out words in various word sequences. Furthermore, the machine learning controller 110 may train the machine learning model 115 to perform next sentence prediction, which may include determining whether a first sentence follows a second sentence. The machine learning model 115 may be trained in an unsupervised manner. That is, the machine learning controller 110 may train the machine learning model 115 based on a corpus of unlabeled training samples, which may include different text without any ground-truth labels.

Figure 2A:
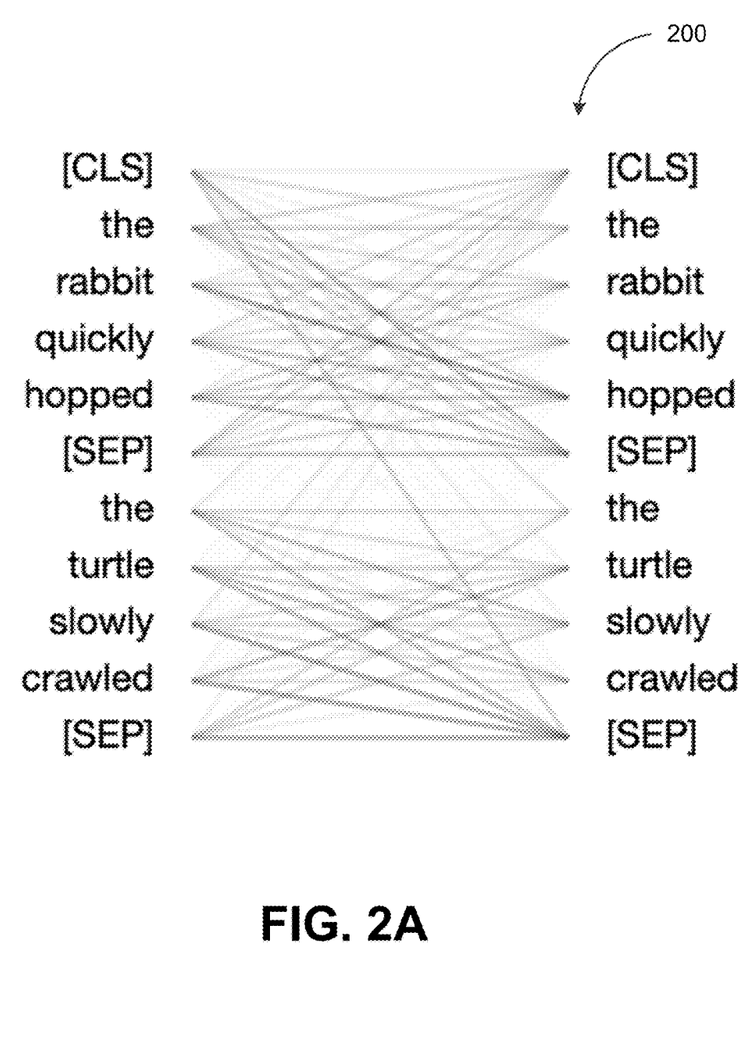
FIG. 2A depicts an example of an attention map, in accordance with some example embodiments.

As noted, the machine learning model 115 may perform the language modeling task and generate the attention map 125 as a representation of the word sequence 150. Moreover, the attention map 125 may include a plurality of attention values, each of which indicating a strength of a connection between two words in the word sequence 150. To further illustrate, FIG. 2A depicts an example of an attention map 200 in which different attention values are visualized as lines having varying intensities. For example, a dark line between two words (e.g., the word "rabbit" and the word "hopped") may indicate a strong connection between the two words. Contrastingly, a faint line between two words (e.g., the word "rabbit" and the word "turtle") may indicate a weak connection between the two words. The natural language processing engine 120 may perform, based on at least a portion of the attention map 125, one or more natural language processing tasks. For instance, the natural language processing engine 120 may perform, based at least on the attention map 125, coreference resolution and identify the antecedent of an ambiguous pronoun in the word sequence 150.

In some example embodiments, the natural language processing engine 120 may apply the result of the one or more natural language processing tasks including, for example, the result of the coreference resolution and identify the antecedent of an ambiguous pronoun in the word sequence 150. For example, the natural language processing engine 120 may be deployed as part of a machine learning based communication system such as, for example, a chatbot, an issue tracking system, and/or the like. Accordingly, the natural language processing engine 120 may assign, based at least on the result of the one or more language processing tasks, one or more labels to the word sequence 150 that indicate a sentiment, a topic, and/or an intent associated with the word sequence 150. The natural language processing engine 120 may determine, based at least on the labels assigned to the word sequence 150, one or more responses to the word sequence 150.

In some example embodiments, the attention map 125 may be part of an attention tensor generated by the machine learning model 115. For example, the machine learning model 115 may include multiple layers l∈L, with each layer having multiple attention heads h∈H. Each attention head h included in the machine learning model 115 may correspond to a different linguistic relationship such as, for example, direct objects, noun modifiers, possessive pronouns, passive auxiliary verbs, prepositions, and coreferences. Accordingly, each attention head h may be configured to generate attention values corresponding to the strength of a particular type of linguistic relationship between different pairs of words in the word sequence 150.

For instance, a first attention head $h_1$ may generate attention values indicative of how strongly a first word in the word sequence 150 is connected to a second word in the word sequence 150 as a possessive pronoun. A different attention head $h_2$ may generating attention values indicative of how strongly the first word in the word sequence 150 is connected to the second word in the word sequence 150 as a noun modifier. The attention tensor generated by the machine learning model 115 may include the attention values generated by each of the heads $h \in H$ occupying various layers $l \in L$ of the machine learning model 115.

The natural language processing engine 120 may perform, based at least on the attention tensor, one or more natural language processing tasks. In some example embodiments, the natural language processing engine 120 may perform, based at least on the attention tensor, coreference resolution, which may include identifying the antecedent of an ambiguous pronoun in the word sequence 150. For example, the word sequence 150 may include a reference words (e.g. a pronoun such as "it") and an m quantity of candidate nouns $C=\{c_1, \ldots, c_m\}$ (e.g. a selection of antecedents referenced by the pronoun "it"). A variety of techniques may be applied to identify the m quantity of candidate nouns $C=\{c_1, \ldots, c_m\}$ including, for example, application and/or interaction specific heuristics. The natural language processing engine 120 may identify, based at least on the attention tensor, a candidate noun c that is referenced by the reference word s.

According to some example embodiments, the natural language processing engine 120 may identify candidate noun c referenced by the reference word s by at least determining, for each of the m quantity of candidate nouns $C=\{c_1, \ldots, c_m\}$, a maximum attention score. For example, the maximum attention score for the candidate noun c may indicate the strength of the connection between the candidate noun c and the reference word s as the antecedent that is being referenced by the reference word s. It should be appreciated that the maximum attention score for the candidate noun c may include the maximum attention values associated with the candidate noun c. For instance, the BERT attention tensor $A \in \mathbb{R}$ H×L×|C| may be sliced into several matrices $A_c \in \mathbb{R}$ H×L, each of which corresponding to an attention map between the reference word s and one of the m quantity of candidate nouns $C=\{c_1, \ldots, c_m\}$. Each matrix $A_c$ may be associated with a binary mask matrix $M_c$. The mask value at each location tuple (l, h) included in the binary mask matrix $M_c$ are shown in Equation (1) below:

$$M_c(l, h) = \begin{cases} 1 & \text{argmax } A(l, h) = c \\ 0 & \text{otherwise} \end{cases} \quad (1)$$

Applying the binary mask matrix $M_c$ to a matrix $A_c$ may eliminate non-maximum attention values from the matrix $A_c$. That is, mask values in the binary mask matrix $M_c$ may be non-zero only at locations where the candidate nouns c is associated with maximum attention (e.g., a greater attention value than other candidate nouns). Accordingly, the binary mask matrix $M_c$ to may be applied to the attention matrix $A_c$ to limit the impact of attention and focus on the most salient parts. Given the matrix $A_c$ and the binary mask matrix $M_c$ for each candidate noun c, the natural language processing engine 120 may determine the maximum attention score, for example, by at least computing the sum of the Hadamard product of the matrix $A_c$ and the binary mask matrix $M_c$. The maximum attention score may be further determined by computing the ratio of each Hadamard sum relative the Hadamard sums for all m quantity of candidate nouns $C=\{c_1, \ldots, c_m\}$ as indicated by Equation (2) below:

$$MAS(c) = \frac{\sum_{l,h} A_c \circ M_c}{\sum_{c \in C} \sum_{l,h} A_c \circ M_c} \in [0, 1]. \quad (2)$$

Figure 2B:
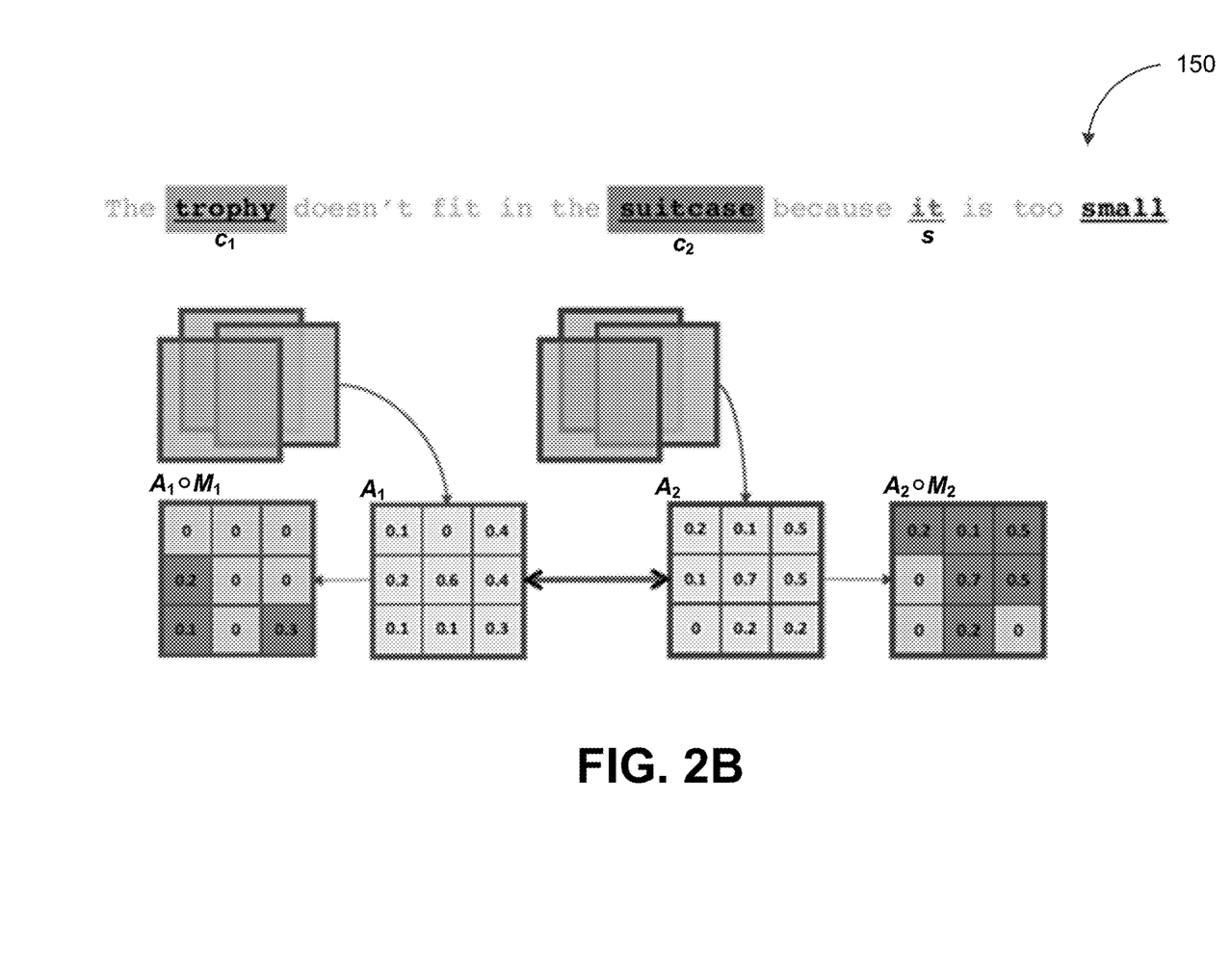
FIG. 2B depicts an example of calculating a maximum attention score for a word sequence, in accordance with some example embodiments.

To further illustrate, FIG. 2B depicts an example of calculating a maximum attention score for the word sequence 150, in accordance with some example embodiments. As shown in FIG. 2B, the word sequence 150 may include a reference word s, a first candidate noun $c_1$, and a second candidate noun $c_2$. To perform the natural language processing task of coreference resolution, the natural language processing engine 120 may determine whether the reference word s refers to the first candidate noun $c_1$ or the second candidate noun $c_2$.

In some example embodiments, the machine learning model 115 trained to perform the language modeling task may generate the attention tensor $A \in \mathbb{R}$ H×L×|C| as a representation of the word sequence 150. The attention tensor A may include, for each of the m quantity of candidate nouns $C=\{c_1, \ldots, c_m\}$ included in the word sequence 150, a matrix $A_c \in \mathbb{R}$ H×L corresponding to an attention map. For example, FIG. 2B shows the attention tensor A as including a first matrix $A_1$ corresponding to a first attention map for the first candidate noun $c_1$ and a second matrix $A_2$ corresponding to a second attention map for the second candidate noun $c_2$.

The first matrix $A_1$ may include a first plurality of attention values, each of which corresponding to a strength of a type of linguistic relationship between the first candidate noun $c_1$ and the reference word s. Meanwhile, the second matrix $A_2$ may include a second plurality of attention values, each of which corresponding to a strength of a type of linguistic relationship between the second candidate noun $c_2$ and the reference word s. The first plurality of attention values and the second plurality of attention values may be determined by the different attention heads $h \in H$ occupying the various layers $l \in L$ of the machine learning model 115.

The natural language processing engine 120 may calculate a maximum attention score for each of the first candidate noun $c_1$ and the second candidate noun $c_2$ including by generating a first masked matrix $A_1 \circ M_1$ for the first candidate noun $c_1$ and a second masked matrix $A_2 \circ M_2$ for the first candidate noun $c_2$. The first masked matrix $A_1 \circ M_1$ and the second masked matrix $A_2 \circ M_2$ may be generated by comparing the attention values occupying the corresponding entries in the first matrix $A_1$ and the second matrix $A_2$. For example, the first masked matrix $A_1 \circ M_1$ may be generated by applying a first binary mask matrix $M_1$ which, as shown in Equation (1) above, may be configured to preserve a first attention value in the first matrix $A_1$ if the first attention value is greater than a second attention value occupying a corresponding entry in the second matrix $A_2$. Contrastingly, the first attention value may become a zero value if the second attention value occupying the corresponding entry in the second matrix $A_2$ is greater than the first attention value.

In some example embodiments, the natural language processing engine 120 may determine, based at least on the first masked matrix $A_1 \circ M_1$, a first maximum attention score for the first candidate noun $c_1$. The natural language processing engine 120 may further determine, based at least on the second masked matrix $A_2 \circ M_2$, a second maximum attention score for the first candidate noun $c_2$. For instance, the first maximum attention score for the first candidate noun $c_1$ may be a ratio of a sum of the Hadamard product of the first matrix $A_1$ and the corresponding binary mask matrix $M_1$ relative to the Hadamard sums of every candidate noun including the first candidate noun $c_1$ and the second candidate noun $c_2$. Meanwhile, the second maximum attention score for the second candidate noun $c_2$ may be a ratio of a sum of the Hadamard product of the second matrix $A_2$ and the corresponding binary mask matrix $M_2$ relative to the Hadamard sums of every candidate noun included in the word sequence 150. The natural language processing engine 120 may identify the first candidate noun $c_1$ as being the antecedent of the reference word s if, for example, the first candidate noun $c_1$ is associated with a higher maximum attention score than the second candidate noun $c_2$.

Figure 3:
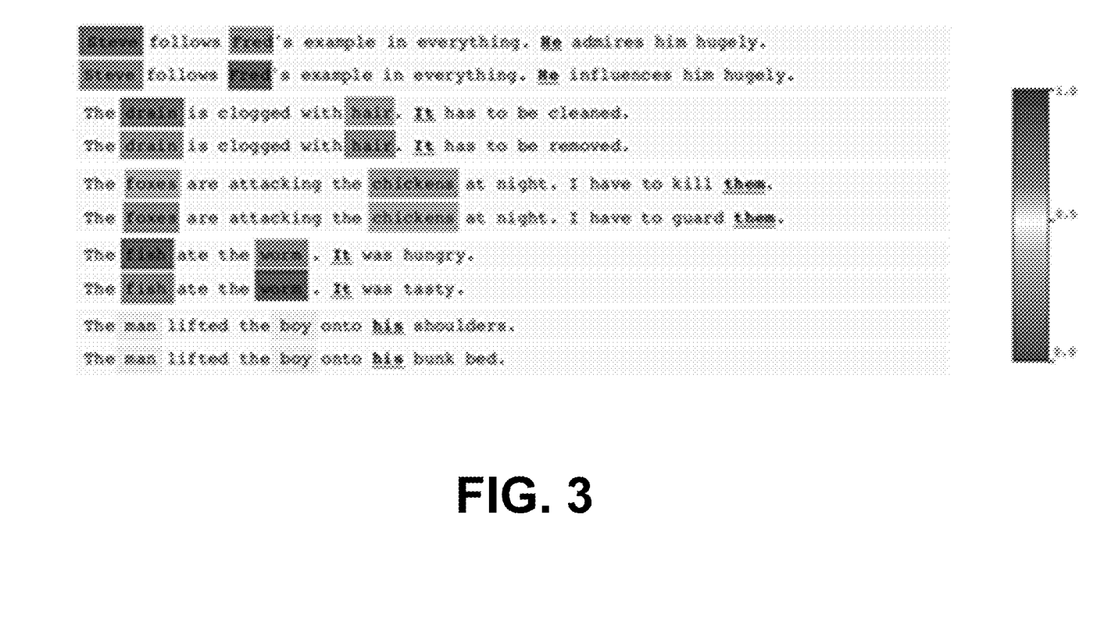
FIG. 3 depicts examples of coreference resolution, in accordance with some example embodiments.

FIG. 3 depicts examples of coreference resolution, in accordance with some example embodiments. As shown FIG. 3, candidate nouns may be associated with different intensity highlights in order to visualize the differences in relative maximum attention scores between the candidate nouns. The maximum attention score associated with a candidate noun may indicate a strength of a connection to a reference word. That is, the higher the maximum attention score associated with the candidate noun, the stronger the connection between the candidate noun and the reference word as the antecedent being referred to by the reference word. Accordingly, the natural language processing engine 120 may identify a first candidate noun instead of a second candidate noun as being the antecedent of a reference word the first candidate noun is associated with a higher maximum attention score than the second candidate noun.

Figure 4:
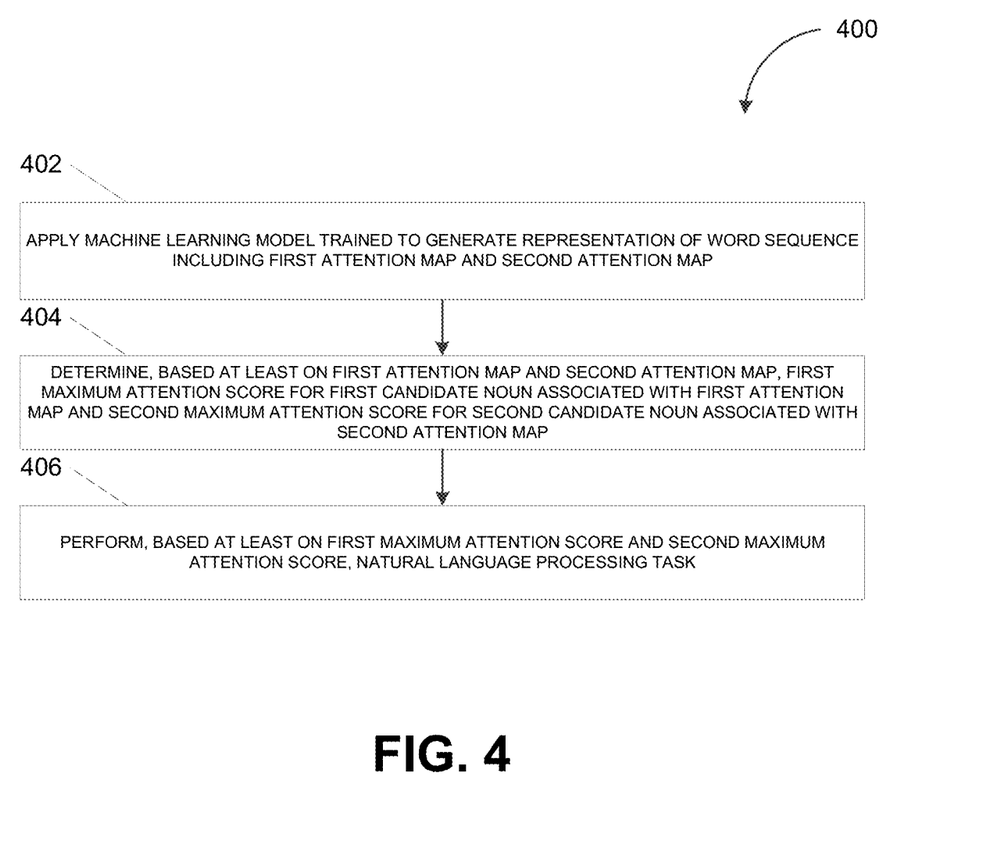
FIG. 4 depicts a flowchart illustrating a process for performing a natural language processing task, in accordance with some example embodiments.

FIG. 4 depicts a flowchart illustrating a process 400 for training a machine learning model, in accordance with some example embodiments. Referring to FIGS. 1A-B, 2A-B, 3, and 4, the process 400 may be performed by the natural language processing engine 120 in order to perform a natural language processing task such as, for example, coreference resolution.

At 402, the natural language processing engine 120 may apply a machine learning model trained to generate a representation of a word sequence including a first attention map and a second attention map. For example, the natural language processing engine 120 may receive, from the client 130, the word sequence 150 including the reference word s, the first candidate noun $c_1$, and the second candidate noun $c_2$. The word sequence 150 may be associated with a request for the natural language processing engine 120 to perform a natural language processing task such as coreference resolution, which may require the natural language processing engine 120 to determine whether the reference word s refers to the first candidate noun $c_1$ or the second candidate noun $c_2$.

In some example embodiments, the natural language processing engine 120 may apply the machine learning model 115, which may be trained by the machine learning controller 110 to perform a language modeling task such as generating the representation of the word sequence 150. The machine learning model 115 may be a bidirectional encoder representations from transformers (BERT) model, which may include a transformer having multiple attention heads $h \in H$ occupying multiple layers $l \in L$. Each attention head h included in the machine learning model 115 may be configured to generate attention values corresponding to the strength of a particular type of linguistic relationship between various pairs of words in the word sequence 150. Examples of the linguistic relationships that may exist between two words may include direct objects, noun modifiers, possessive pronouns, passive auxiliary verbs, prepositions, and coreferences.

For example, as shown in FIG. 2B, the machine learning model 115 trained to perform the language modeling task may generate, as a representation of the word sequence 150, the attention tensor $A \in \mathbb{R}$ H×L×|C| including a first matrix $A_1$ corresponding to a first attention map for the first candidate noun $c_1$ and a second matrix $A_2$ corresponding to a second attention map for the second candidate noun $c_2$. The first matrix $A_1$ may include a first plurality of attention values corresponding to a strength of various linguistic relationships between the first candidate noun $c_1$ and the reference word s. Meanwhile, the second matrix $A_2$ may include a second plurality of attention values corresponding to a strength of various linguistic relationships between the second candidate noun $c_2$ and the reference word s.

At 404, the natural language processing engine 120 may determine, based at least on the first attention map and the second attention map, a first maximum attention score for a first candidate noun associated with the first attention map and a second maximum attention score for a second candidate noun associated with the second attention map. The natural language processing engine 120 may calculate a maximum attention score for each of the first candidate noun $c_1$ and the second candidate noun $c_2$ including by generating a first masked matrix $A_1 \circ M_1$ for the first candidate noun $c_1$ and a second masked matrix $A_2 \circ M_2$ for the first candidate noun $c_2$. For example, the first masked matrix $A_1 \circ M_1$ may be generated by applying a first binary mask matrix $M_1$ configured to preserve a first attention value in the first matrix $A_1$ if the first attention value is greater than a second attention value occupying a corresponding entry in the second matrix $A_2$. Contrastingly, the first attention value may become a zero value if the second attention value occupying the corresponding entry in the second matrix $A_2$ is greater than the first attention value.

In some example embodiments, the natural language processing engine 120 may determine a first maximum attention score for the first candidate noun $c_1$, which may be a ratio of a sum of the Hadamard product of the first matrix $A_1$ and the corresponding binary mask matrix $M_1$ relative to the Hadamard sums of other candidate nouns such as the second candidate noun $c_2$. Moreover, the natural language processing engine 120 may determine a second maximum attention score for the second candidate noun $c_2$, which may be a ratio of a sum of the Hadamard product of the second matrix $A_2$ and the corresponding binary mask matrix $M_2$ relative to the Hadamard sums of other candidate nouns such as the first candidate noun $c_1$.

At 406, the natural language processing engine 120 may perform, based at least on the first maximum attention score and the second maximum attention score, a natural language processing task. For instance, the natural language processing engine 120 may be configured to perform coreference resolution, which may require the natural language processing engine 120 to determine whether the reference word s refers to the first candidate noun $c_1$ or the second candidate noun $c_2$. According to some example embodiments, the natural language processing engine 120 may perform, based at least on the first maximum attention score of the first candidate noun $c_1$ and the second maximum attention score of the second candidate noun $c_2$, the coreference resolution. For example, the natural language processing engine 120 may determine that the first candidate noun $c_1$ is the antecedent of the reference word s based at least on the first candidate noun $c_1$ having a higher maximum attention score than the second candidate noun $c_2$.

Figure 5:
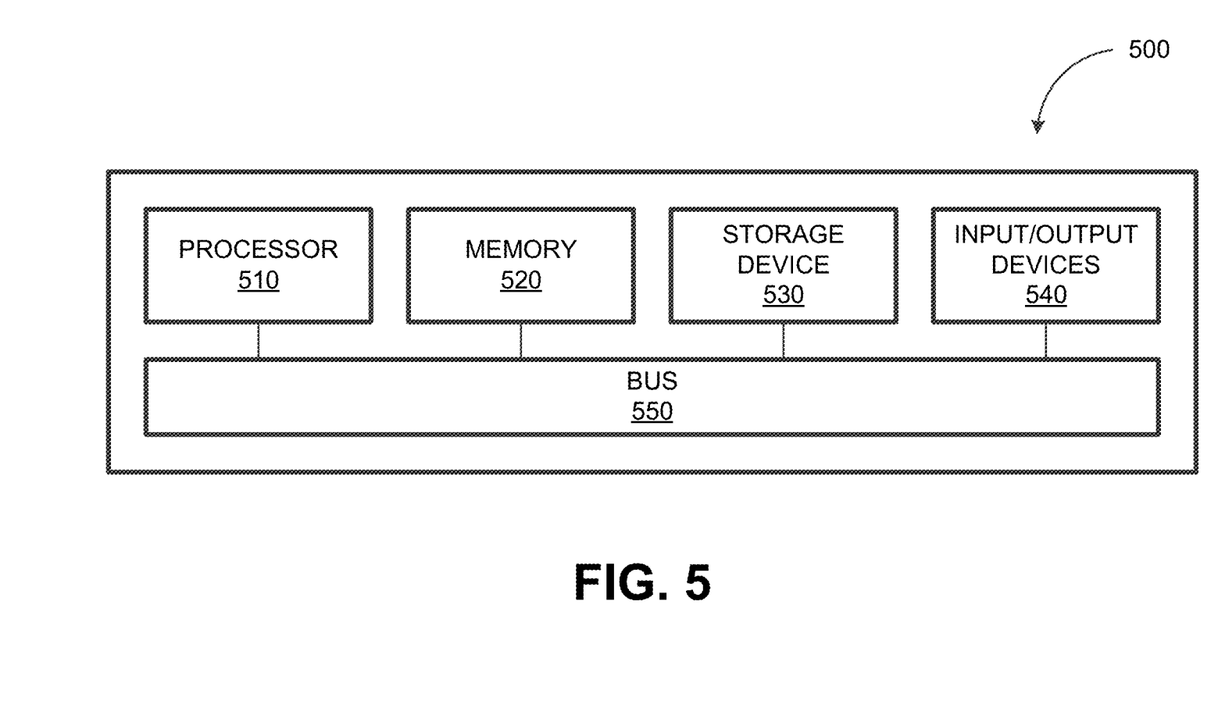
FIG. 5 depicts a block diagram illustrating a computing system, in accordance with some example embodiments.

FIG. 5 depicts a block diagram illustrating a computing system 500, in accordance with some example embodiments. Referring to FIGS. 1A and 5, the computing system 500 can be used to implement the machine learning controller 110, the natural language processing engine 120, and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the machine learning controller 110 and the natural language processing engine 120. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be stand-alone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
at least one data processor; and
at least one memory storing instructions which, when executed by the at least one data processor, result in operations comprising:
applying a machine learning model trained to generate a representation of a word sequence, the word sequence including a reference word, a first candidate noun, and a second candidate noun, the representation of the word sequence including a first attention map and a second attention map, the first attention map including a first plurality of attention values indicative of a first strength of a plurality of linguistic relationships between the reference word and the first candidate noun, and the second attention map including a second plurality of attention values indicative of a second strength of the plurality of linguistic relationships between the reference word and the second candidate noun;
performing, based at least on the first attention map and the second attention map, a natural language processing task, the natural language processing task including determining that the reference word refers to the first candidate noun and not a second reference noun; and
generating a user interface displaying a result of the natural language processing task.

2. The system of claim 1, further comprising:
generating a first masked matrix by at least applying, to the first attention map, a first binary mask matrix, the first masked matrix generated to include an entry having a first attention value in response to the first attention value occupying the entry in the first attention map being greater than a second attention value occupying a corresponding entry in the second attention map.

3. The system of claim 2, further comprising:
generating a second masked matrix by at least applying, to the second attention map, a second binary mask matrix, the second masked matrix generated to include a zero value in the corresponding entry in response to the second attention value occupying the corresponding entry in the second attention map being less than the first attention value occupying the entry in the first attention map.

4. The system of claim 3, wherein a first maximum attention score comprises a ratio of a first Hadamard sum associated with the first candidate noun relative to a sum of the first Hadamard sum and a second Hadamard sum associated with the second candidate noun, wherein the first Hadamard sum is determined based on the first masked matrix, and wherein the second Hadamard sum is determined based on the second masked matrix.

5. The system of claim 1, wherein the plurality of linguistic relationships include direct objects, noun modifiers, possessive pronouns, passive auxiliary verbs, prepositions, and coreferences.

6. The system of claim 5, wherein the machine learning model includes a plurality of attention heads, and wherein each of the plurality of attention heads is configured to determine a strength of one of the plurality of linguistic relationships between each pair of words present in the word sequence.

7. The system of claim 1, wherein the representation of the word sequence comprises an attention tensor that includes the first attention map and the second attention map.

8. The system of claim 1, wherein the machine learning model comprises a bidirectional encoder representations from transformers model.

9. The system of claim 1, further comprising:
training the machine learning model to generate the representation of the word sequence including by training the machine learning model to perform a masked language modeling and/or a next sentence prediction.

10. The system of claim 9, wherein the machine learning model is trained, based at least on unlabeled training data, to generate the representation of the word sequence.

11. A computer-implemented method, comprising:
applying a machine learning model trained to generate a representation of a word sequence, the word sequence including a reference word, a first candidate noun, and a second candidate noun, the representation of the word sequence including a first attention map and a second attention map, the first attention map including a first plurality of attention values indicative of a first strength of a plurality of linguistic relationships between the reference word and the first candidate noun, and the second attention map including a second plurality of attention values indicative of a second strength of the plurality of linguistic relationships between the reference word and the second candidate noun;
performing, based at least on the first attention map and the second attention map, a natural language processing task, the natural language processing task including determining that the reference word refers to the first candidate noun and not a second reference noun; and
generating a user interface displaying a result of the natural language processing task.

12. The computer-implemented method of claim 11, further comprising:
generating a first masked matrix by at least applying, to the first attention map, a first binary mask matrix, the first masked matrix generated to include an entry having a first attention value in response to the first attention value occupying the entry in the first attention map being greater than a second attention value occupying a corresponding entry in the second attention map; and generating a second masked matrix by at least applying, to the second attention map, a second binary mask matrix, the second masked matrix generated to include a zero value in the corresponding entry in response to the second attention value occupying the corresponding entry in the second attention map being less than the first attention value occupying the entry in the first attention map.

13. The computer-implemented method of claim 12, wherein a first maximum attention score comprises a ratio of a first Hadamard sum associated with the first candidate noun relative to a sum of the first Hadamard sum and a second Hadamard sum associated with the second candidate noun, wherein the first Hadamard sum is determined based on the first masked matrix, and wherein the second Hadamard sum is determined based on the second masked matrix.

14. The computer-implemented method of claim 11, wherein the plurality of linguistic relationships include direct objects, noun modifiers, possessive pronouns, passive auxiliary verbs, prepositions, and coreferences.

15. The computer-implemented method of claim 14, wherein the machine learning model includes a plurality of attention heads, and wherein each of the plurality of attention heads is configured to determine a strength of one of the plurality of linguistic relationships between each pair of words present in the word sequence.

16. The computer-implemented method of claim 11, wherein the representation of the word sequence comprises an attention tensor that includes the first attention map and the second attention map.

17. The computer-implemented method of claim 11, wherein the machine learning model comprises a bidirectional encoder representations from transformers model.

18. The computer-implemented method of claim 11, further comprising:
training the machine learning model to generate the representation of the word sequence including by training the machine learning model to perform a masked language modeling and/or a next sentence prediction.

19. The computer-implemented method of claim 18, wherein the machine learning model is trained, based at least on unlabeled training data, to generate the representation of the word sequence.

20. A non-transitory computer readable medium storing instructions, which when executed by at least one data processor, result in operations comprising:
applying a machine learning model trained to generate a representation of a word sequence, the word sequence including a reference word, a first candidate noun, and a second candidate noun, the representation of the word sequence including a first attention map and a second attention map, the first attention map including a first plurality of attention values indicative of a first strength of a plurality of linguistic relationships between the reference word and the first candidate noun, and the second attention map including a second plurality of attention values indicative of a second strength of the plurality of linguistic relationships between the reference word and the second candidate noun;
performing, based at least on the first attention map and the second attention map, a natural language processing task, the natural language processing task including determining that the reference word refers to the first candidate noun and not a second reference noun; and
generating a user interface displaying a result of the natural language processing task.

* * * * *